Aug. 14, 1928.

A. S. KROTZ

TRACTOR

Filed Nov. 10, 1922

Inventor
Alvaro S. Krotz
by Arthur F. Durand
Atty.

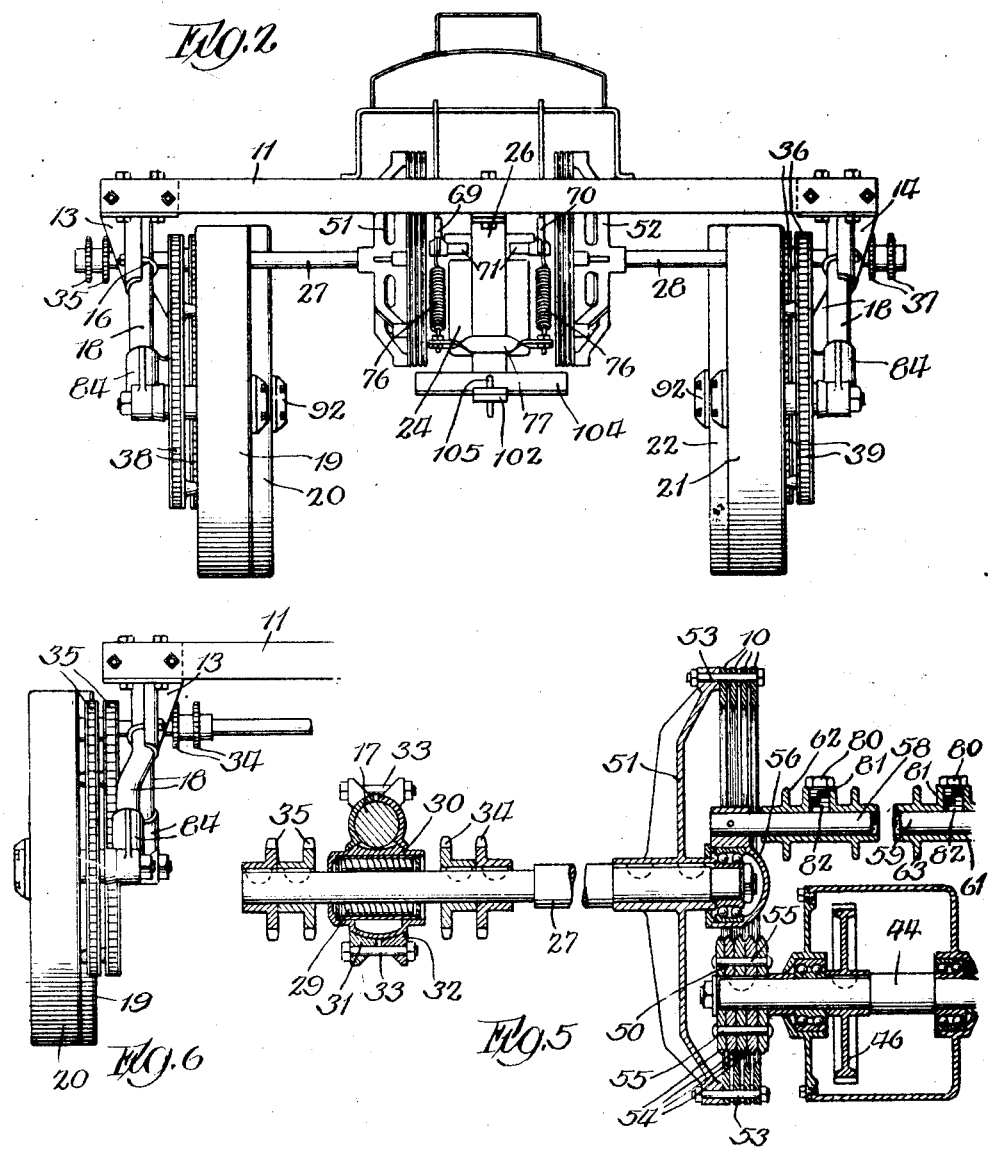

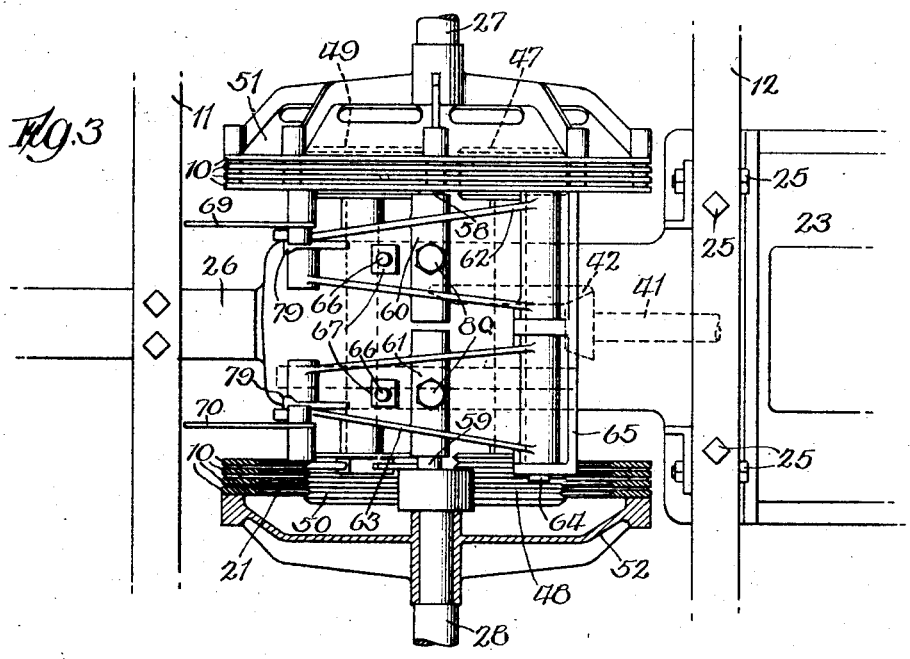

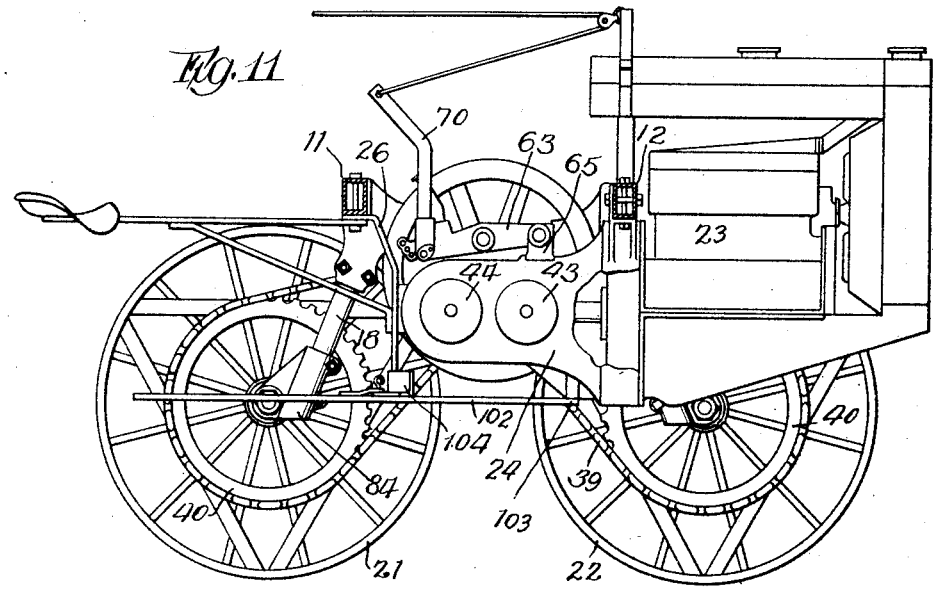
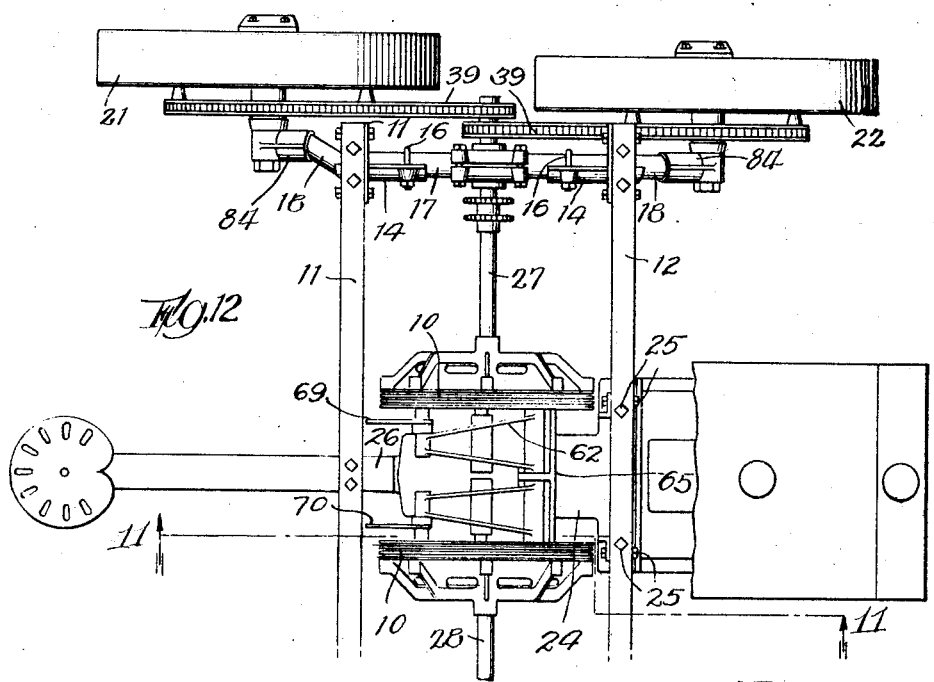

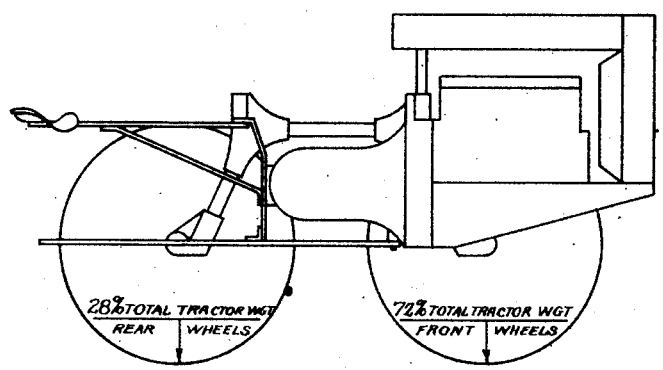
TRACTOR STATIONARY
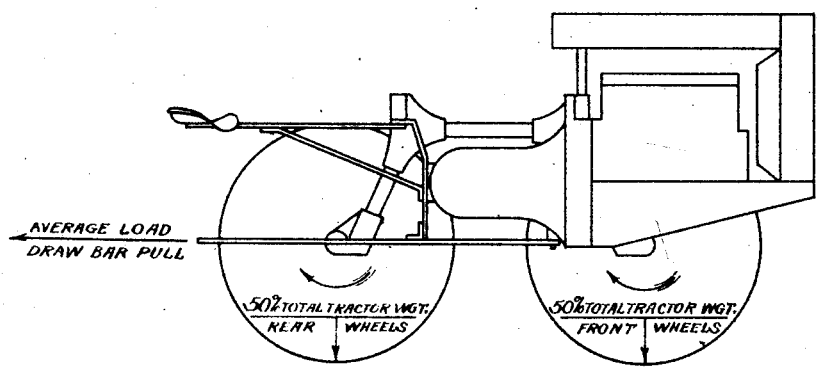
TRACTOR PULLING

Patented Aug. 14, 1928.

1,680,553

UNITED STATES PATENT OFFICE.

ALVARO S. KROTZ, OF JANESVILLE, WISCONSIN.

TRACTOR.

Application filed November 10, 1922. Serial No. 600,154.

This invention relates to tractors designed for hauling agricultural implements and for general farm purposes, and the principal object thereof is to provide an improved tractor which will be simple in construction and not likely to get out of order, which may be manufactured at a minimum of expense, and which will be convenient and effective for the purpose for which it is designed.

This invention relates for the most part to the transmission mechanism through which power is communicated from the engine of the tractor to the driving wheels thereof; and a further object thereof is to provide improved driving mechanism of the friction type through which two driving wheels upon each side of the tractor may be driven independently of those upon the other side, and either in a forward or in a reverse direction; to thereby provide for the operation of the tractor both forward and backward, the steering thereof, and the turning of the same about with a minimum space.

A further object of this invention is to provide improved frame construction in tractors of the type wherein two supporting wheels are present upon each side thereof, and all of which are commonly driven in unison from the engine; the construction of the frame being such that increased flexibility thereof is secured upon the one hand, and greater strength upon the other.

Another object of this invention is to provide an improved tractor of the general type or class above referred to and wherein the disposition of the engine relative to the other parts of the machine is such as to secure greater efficiency in the operation of the tractor.

A further object of this invention is to provide an improved tractor of the type referred to and wherein the construction of the frame, the arrangement of the wheels, and the disposition of the engine and transmission mechanism relative to the frame and to the wheels is such that the downward force upon the several driving wheels is more uniform than has heretofore commonly been the case, and is in fact substantially equal as regards the front and rear driving wheels at opposite ends of the machine.

With the above and other objects of invention in view, the invention consists in the improved tractor and subordinate and auxiliary parts thereof illustrated in the accompanying drawings and hereinafter described and explained; and in such variations and modifications thereof, within the scope of the concluding claims, as will be obvious to those skilled in the art to which this invention relates.

In the drawings accompanying and forming a part of this specification and wherein the preferred embodiment of the invention is illustrated:

Figure 2 is a view showing the same in end elevation as seen from a position at the rear thereof.

Figure 3 is a fragmentary plan view upon a larger scale than Figures 1 and 2 showing certain parts of the mechanism through which the driving wheels of the improved tractor are driven.

Figure 5 is a fragmentary view illustrating certain parts of the driving mechanism shown in Figures 3 and 4; this view relating to the driving mechanism associated with the driving wheels upon the left hand side of the tractor, referring to Figure 2.

Figure 6 is a fragmentary view showing the left hand end of the improved tractor with the end frame reversed so as to convert it into a tractor having a wider tread than is the case when the end frames are set narrow, as shown in Figure 2.

Figure 7 is a detail view showing the manner in which the lower ends of the legs of the side or end frames are connected with brackets which support the axles of the driving wheels.

Figure 8 is a view showing the axle construction for the wheels upon a plane at right angles to the plane of Figure 7.

Figure 9 is a view showing a modified form of axle support for the driving wheels.

Figure 10 is a view showing a still further modified method of supporting the wheels from the end frames.

Figure 11 is a view having the general characteristics of a side elevation but showing only the parts upon the further side of the machine, that is, those beyond a vertical plane extending longitudinally of the tractor and indicated approximately by the line 1—1, Figure 12.

Figure 12 is a fragmentary view showing one side of the improved tractor in plan, the part shown being that upon the left-hand side of the central portion of the machine.

Figure 1:
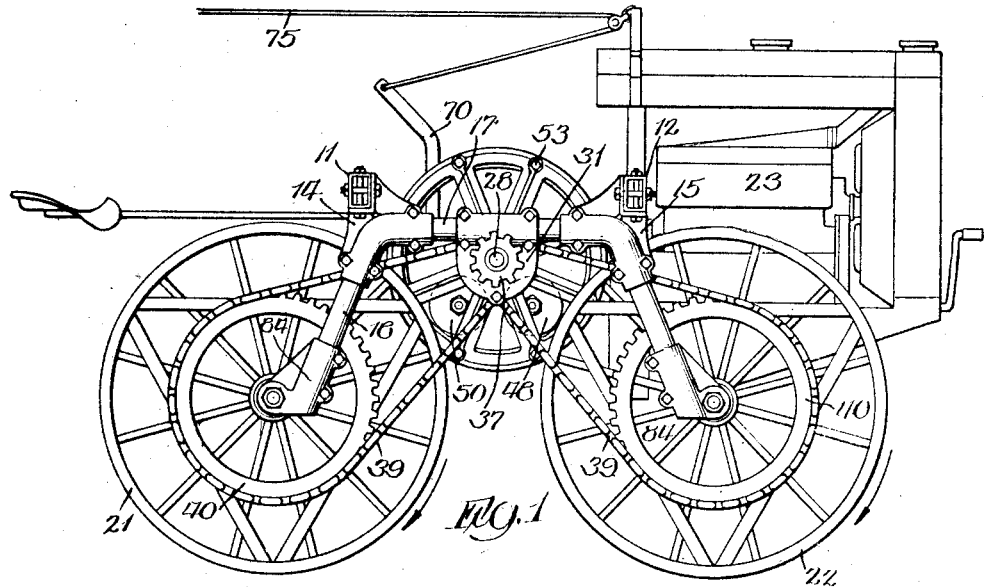
Figure 1 is a view showing the improved tractor in side elevation.

Figure 13 is a view in the nature of a diagram illustrating approximately the distribution of the load carried thereby upon the front and rear pairs of oppositely located driving wheels when the tractor is at rest; and Figure 14 is a view similar to Figure 13 showing the approximate load or downward pressure upon the two pairs of driving wheels when the tractor is in use and is pulling a load approximating that for which the tractor is best suited.

Referring to the drawings, the reference numerals 11, 12 designate two transversely extending frame bars spaced apart from one another and shown as of hollow box-like construction, and which form the main supporting frame of the improved tractor; said frame bars being arranged quite close together so that the frame which they form is considerably narrower than the distance between transverse vertical planes passing through the axes of the driving wheels.

Secured adjacent the ends of the frame bars 11, 12 are bracket members 13 (and another not shown at the left hand end of the frame), and 14, 15 at the right hand side thereof, which bracket members are provided with curved seats within which the end frame members of the tractor are secured by suitable stirrups such as are shown at 16 in Figure 2; said end frames being shown as formed from round bar iron bent to provide horizontal upper portions 17 and depending and diverging end or leg portions 18, as shown in Figure 1. The end frame upon the left hand side of the machine is not shown in full, although such parts thereof as appear are designated by the same numerals as those applied to the end frame shown in Figure 1, which is the frame upon the right hand side of the machine. The curved portions at the upper ends of these end frames where the horizontal parts 17 merge into the diverging legs 18 lie within recesses provided in the brackets 13, 14 above mentioned, and are secured in place therein by the stirrups 16, as explained. The wheels 19, 20, 21, 22 are identical in construction with one another, and all are shown as driven from the engine of the tractor. These wheels are supported from the lower ends of the depending parts or legs 18 of the end frames in a manner to be hereinafter disclosed in detail, and the front and rear legs of each end frame are shown as offset so that the front and rear wheels upon each side of the tractor may be driven through separate and distinct sprocket chains, as will hereinafter appear.

The transverse frame bars 11, 12 are comparatively long and, being arranged comparatively close to one another as explained, provide a main frame having as great flexibility as possible consistent with adequate strength for supporting the engine and transmission mechanism of the tractor, while the end frames are made of much heavier material and are as rigid as practicable; thus providing a construction wherein the flexibility of the frame in its entirety is inherent in the transverse bars thereof, and in which the end frame members are made as rigid as possible in order to support the wheels in proper position relative to one another and avoid bending of the end frames when the tractor is in use.

The reference numeral 23 designates the engine of the improved tractor, which may be of various forms and with which the invention is in no way concerned. The rear end of the crank case of the engine is secured to the front end of a housing 24 within which certain transmission gearing is located, the front end of the housing being supported from the cross bar 12 as by means of bolts 25 and the rear end thereof being supported from the rear frame bar 11 by means of a stirrup 26; substantially the entire engine structure projecting forward beyond a vertical plane of the front transmission bar 12, as will be appreciated. The engine will be provided with the usual radiator and storage tanks for cooling water, fuel, etc., although these matters are not explained in detail as they form no part of the invention to which this present application relates.

Extending transverse to the tractor and preferably located centrally fore and aft thereof are two driving shafts 27, 28 arranged in line with one another and the outer ends of which are supported in bearings, one of which is shown at 29, Figure 5, and both of which are alike; said bearings being preferably supported from the upper cross members 17 of the end frames in such a manner as to be free to move or rock in all angular directions. This end is shown as accomplished by providing the sleeves 30 which carry the bearings with external spherical portions 31, which portions are received in recesses of like form provided in co-operating bracket members 32 which are clamped together by means of suitable bolts 33. The supports thus provided, one such support being provided for the outer end of each driving shaft, are obviously supports which will permit rocking of the bearing carrying members or sleeves 30 and of the bearings supported thereby, so that the shafts 27, 28 may be swung angularly about said bearings as centers for reasons hereinafter appearing without producing binding at the bearings. Said bearings are also of such form or type that the driving shafts may move slightly therein in the direction of their length in order to permit proper co-operation of the parts which comprise the driving mechanism, and to prevent injury thereto by movement of the frame or distortion thereof, as will hereinafter appear.

The driving shafts 27, 28 are provided with pairs of sprocket pinions 34, 35 at one end, and 36, 37 at the other end, either pair of which may serve to drive the driving wheels through sprocket chains 38, 38 at the left hand side of the tractor, and 39, 39 at the right hand side; these chains engaging large sprocket gears designated by the reference numeral 40 secured to the several wheels. These pairs of sprocket pinions are arranged one pair upon each side of the adjacent bearing 29 and as close thereto as practicable in order that the swinging of the driving shafts will have a negligible effect upon the driving chains; and each sprocket chain is independent of all the others, an individual driving chain being provided for each wheel of the tractor.

Figures 1 and 2 show the improved tractor set narrow, and the driving as accomplished through the sprocket pinions 34, 36. The end frames may, however, be removed from the transverse frame bars and turned around, and secured to the frame bars in the new position illustrated in Figure 6, thus increasing the width or tread of the tractor to a very material extent; in which latter arrangement of the parts driving is accomplished through the outer pairs 35, 37 of sprocket pinions. All the wheels 19, 20, 21 and 22 act to support the tractor, and all are driven in unison through the sprocket chain mechanism referred to, as will be understood.

Figure 4:
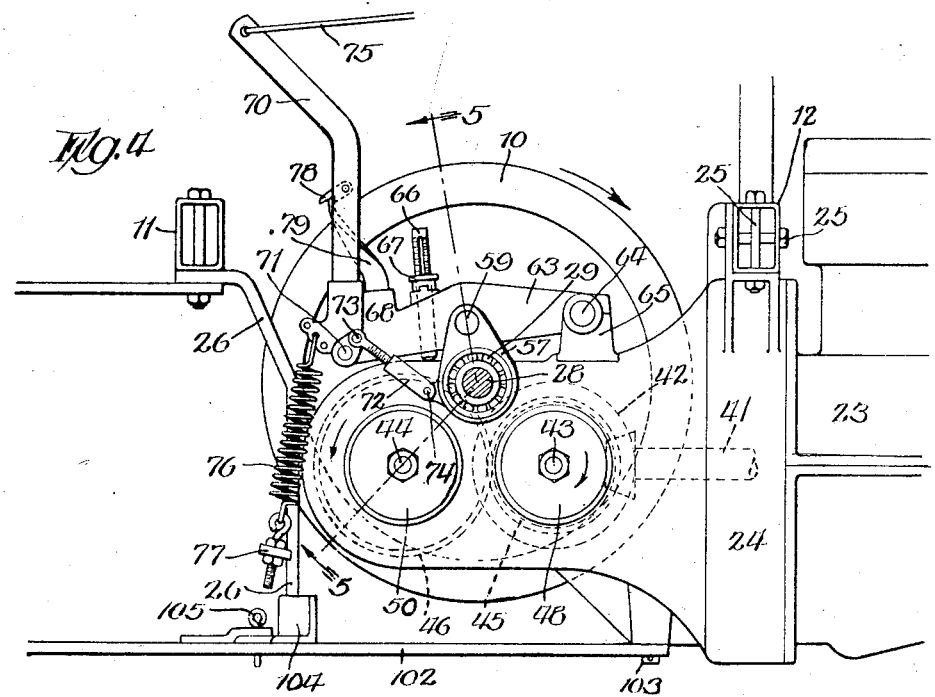
Figure 4 is a view similar to Figure 3 in subject matter and extent, but showing the mechanism shown therein in side elevation.

The crank shaft of the engine is indicated in dotted lines at 41, Figure 4, as is also indicated a bevel pinion at its end which engages a bevel gear 42 secured upon a shaft 43 and acting to drive the same. This shaft operates a second shaft 44 through gears 45, 46, so that said two shafts rotate in unison and in opposite directions; both these shafts being supported in ball bearings, see Figure 5, supported in the side wall of the housing 24. The shaft 43 extends beyond each side of the housing and carries friction driving members 47, 48 at its two ends and the shaft 44 extends in a like manner and carries friction driving members 49, 50 at its ends.

The inner ends of the driving shafts 27, 28 carry spiders 51, 52 rigidly secured thereupon and which spiders carry annular friction driven members which surround the driving members above referred to; the driven member carried by the spider 51 co-operating with the driving members 47 and 49 while the driving member carried by the spider 52 surrounds and co-operates with the other driving members 48, 50.

Preferably the driven members carried by the spiders are made up of a plurality of steel rings 10 spaced slightly apart from one another and secured to the spiders by bolts 53; while the driving members are made up of several steel disks 54 secured together by bolts 55 as best shown in Figure 5; the disks being V-shaped at their peripheries and the inner edges of the rings being of like form so as to fit within the grooves.

Each spider with the rings carried thereby is movable bodily by swinging the shaft which carries it about the bearing 29 at the outer end thereof in order to move the inner peripheries of the rings into driving engagement with one or another of the driving members 47, 49, or 48, 50, through which the driving shafts 27, 28 are driven. In order to accomplish this end the inner extremities of the shafts are supported in bearings carried by oscillating bearing supports 56, 57 secured to the ends of short shafts or journals 58, 59; which in turn are supported in bearings 60, 61 located intermediate the ends of oscillating frame members 62, 63 which frame members are pivotally supported at their forward ends on a rod 64 which is supported by a pedestal 65 secured to the housing 24.

The frames 62, 63 thus serve to support the inner ends of the driving shafts, the spiders and the friction rings 10 carried thereby in proper relation to the driving members 47, 49, and 48, 50; the frames being each provided with a stop 66 in threaded engagement therewith, and which may be screwed up or down to adjust the vertical position of each frame and parts carried thereby. The lower ends of these stops abut against the housing 24; and vertical movable locking members 67 slidable but non-rotatably connected with the stops; engage the frame through a lug and recess connection at 68, to thereby lock the stops in whatever position they may be placed.

When the spiders and friction rings carried thereby are in a neutral central position the rings are out of engagement with the driving members 47, 49, and 48, 50 upon the two sides of the housing 24; and in order to move the friction rings of a spider into engagement with the friction members co-operating therewith so as to be driven thereby the frame members 62, 63 carry levers 69, 70 at their free ends, said levers being pivotally connected with the frames as indicated at 71 in Figure 4. These levers are in turn operatively connected with the bearing carrying members 56, 57 through adjustable link connections, one of which is shown at 72 in Figure 4; said links being pivotally connected with the levers and with the bearing carrying members at 73, 74. It will be appreciated that this lever connection is the same for both the frames 62, 63, although the operating means for the frame 63 is the only one which is shown upon a larger scale in the drawings. It therefore follows that rearward movement of the lever 69 will move the inner end of the driving shaft 27 to the left or rearward, and the rings carried by the spider 51 upon said free end into driving engagement with the friction member 47, thus securing the driving of the wheels upon the left hand side of the tractor from said driving members in one direction, while movement of said lever in a reverse direction will move the friction rings into driving engagement with the driving member 49 thus securing driving of said shaft in the other direction. Likewise movement of the lever 70 to the left will bring the friction rings carried by the spider 52 into driving engagement with the driving member 48, while movement of the lever in a reverse direction will move the said friction rings into driving engagement with the driving member 50.

The levers 69, 70 while they may be operated directly by hand are preferably moved in one direction by lines 75, and in a reverse direction by springs 76, the upper ends of which are adjustably connected with said levers through a series of eyes and the lower ends of which are adjustably secured to an abutment 77; and the preferred arrangement of the parts is such that the tractor will be driven forward when the springs 76 are free to act to hold the rings 10 in driving engagement with the friction members 47, 48, and driven in a reverse direction when said friction rings are held in engagement with the driving members 49, 50 by the lines 75. As above explained when the levers are in a neutral position the driving of the shafts 27, 28 is interrupted; and the levers are provided with pivoted latches 78 which may be moved into engagement with fixed abutments 79 to thereby hold the levers in their neutral positions.

The friction driving members 47, 48 are the ones which are in use when the tractor is being driven forward, the wheels and the principal parts of the driving mechanism rotating in the direction indicated by the arrows in Figures 1 and 4. When the tractor is being driven backward all the friction driving members still rotate in the direction indicated, rotation in a reverse direction being imparted to the spiders because they will then have been moved to bring the friction rings carried thereby into engagement with the rearward driving friction members 49, 50. These last mentioned members are driven at a somewhat slower speed than the members 47, 48 used in forward driving because of the difference in size indicated between the gears 42 and 46; it being desirable to back at a slower speed than the speed employed in forward driving.

The journals 58, 59 are slidable slightly in the direction of their lengths in the bearings 60, 61 provided for them; and the reference numerals 80 designate set screws the inner ends of which bear against springs 81, which springs in turn act to press leather or equivalent washers 82 against the said journals to a uniform seating of the inclined inner edges of the friction rings with the grooves of the driving members. As a matter of fact there will be little longitudinal movement of the parts after the friction rings and driving disks have become properly adapted to one another; although movement may occur at any time due to weaving of the frame when the tractor is in operation which movement, as will be appreciated, will be compensated for by the longitudinal movement permitted by the construction above explained.

The axes of the journals 58, 59 as best shown in Figure 4 are preferably located slightly to the rear of a vertical plane extending through the axes of the driving shafts 27, 28 when they are in their neutral or mid positions, so that the angle between the inner peripheries of the friction rings and the forward driving members 47, 48 above the location of contact between said parts will be less than the corresponding angle between the said rings and the rearward driving members 49, 50; from which it follows that movement of the rings into engagement with the forward driving friction members will be through a more acute angle of approach, and will result in greater wedging action, than will be the case when said rings are moved into engagement with the rearward friction driving members. These last mentioned driving members being those employed in backing the tractor it follows that a more easily controllable backing action is secured by the arrangement of the parts above pointed out than would otherwise be the case.

It will be appreciated that the frames 62, 63 serve as supports for all the elements concerned with the driving of the tractor, both in forward and rearward directions, and serve to hold said several parts in permanent and fixed relation to one another; which is a matter of advantage in tractors of the type to which this invention relates in that the parts concerned with the driving and with the control of the driving mechanism after having been properly adjusted relative to one another, will be maintained in such positions and will not be likely to get out of adjustment due to movements of the frame or to distortion thereof; and it will also be appreciated that proper clearance between the friction rings and all the driving members can be secured and regulated by the threaded rods 66, and such adjustment maintained by the locking member 67, which adjustment serves to secure proper engagement between the friction driving members for both forward and rear driving.

The wheels 19, 20, 21, 22 are supported upon spindles which are all alike and one of which is designated by the reference numeral 83 in Figures 7 and 8, said spindles being carried by brackets 84 which are split as indicated at 85, and are clamped onto the lower ends of the legs 18 of the end frames by bolts 86, a key and key-way connection being provided at 87 to prevent twisting of the brackets upon the lower ends of the legs.

The brackets 84 are adjustable bodily upon the legs when the bolts 86 are loosened slightly, this being for the purpose of adjusting the tension of the sprocket chains 38, 39 through which the wheels are driven; such adjustment being secured by threading the lower ends of the interiors of the sockets into which the free ends of the legs extend, as indicated at 88, and providing a rotatable threaded abutment 89 within said threaded portion which may be screwed up or down to vary the tension of the driving chains. After the parts have been properly adjusted the bolts 86 will as a matter of course be tightened to relieve the abutment 89 as much as practicable from the thrust along the legs 18.

The spindles 83 support the hubs 90 of the driving wheels through suitable bearing sleeves, as shown in Figure 8, and the outer ends of these spindles having each a collar 91 fastened thereupon and against which the outer ends of the hubs and bearing sleeves abut; and covers 92 are then secured to the hub as by bolts 93, the inner surface of the cover being so positioned as to contact with the extremities of the spindles 83. It therefore follows that the collars 91 resist movement of the wheel hubs in both directions along the spindles 83 and maintain the wheels in proper position upon the spindles.

Figure 9 shows a form of the invention in which a bracket 94 is pivotally secured at 95 to the lower end of a leg 96 similar to the legs 18, and which bracket carries a spindle 97 similar to the spindle 83. In this form of the invention adjustment to vary the tension of the driving chains is secured by a bolt 98 extending through a threaded opening in a lug 99 of the bracket, and the inner end of which abuts against the side of the leg 96, while in the form of the invention illustrated in Figure 10 the lower end of a depending leg is bent outward as indicated at 101 to provide a bearing spindle for the hub 90 of the wheel, said hub being restrained from movement longitudinally thereof by a collar 91, the same as in the form of our invention illustrated in Figure 8.

The reference numeral 102 designates the draw bar of the tractor through which it is hitched to whatever is to be drawn, the front end of said draw bar being pivotally supported from the housing 24, as indicated at 103, so that the draw bar may swing in a horizontal plane. This swinging movement is guided by a curved segment 104 which has holes therein through which a pin 105 may extend to thereby hold the draw bar in various positions as may be required for the effective hauling of various different kinds of agricultural implements or other devices to be drawn.

While ground wheels are shown as the traction means, it is obvious that the invention may be employed in connection with traction means of any suitable or desired character, and wherever wheels are specified it is to be understood that these or other equivalent traction means are contemplated. The transverse main frame, it will be seen, is a substantial distance above the hubs of the wheels, and is shown in a horizontal plane above the tops of the wheels. Thus the wheel base is shortened, without further shortening of the main frame, and the wheel base is longer than the main frame longitudinally of the machine. The side frames are not only detachable, but are reversible to widen or narrow the tread of the machine, or the distance between the wheels at one side and the wheels at the other side, as previously explained. The transmission is controlled, in effect, by slightly skewing either of the two shafts 27 and 28, and consequently steering is effected by skewing these shafts to open and close the transmission between the driving means and the traction means at either side of the machine. The traction means are operative in either their outside position or inside position, in conjunction with the two shafts, without disturbing either shaft, in the manner previously explained. Not only is it true that the engine is mounted somewhat forward of the front axis of the wheels, so that it projects beyond the wheel base, but it is also true that the engine is supported only at its rear end, so that the weight of the engine is communicated through the comparatively short main frame of the side frames and from the latter to the wheels or other traction means.

In view of the premises and referring to Figures 13 and 14, it will be appreciated that the engine is located entirely in front of the vertical plane of the front frame bar and is located for the most part in front of a vertical plane extending through the axes of the front driving wheels. This arrangement of parts concentrates the greater part of the weight of the tractor upon the forward driving wheels when the tractor is at rest, the proportion of weight borne by the front wheels varying as a matter of course with the inclination of the legs, which determine the amount of engine weight in front of their axes. In practice, and with a tractor having the proportion and arrangement of parts substantially as illustrated, it has been found that approximately 72% of the weight of the tractor is concentrated upon the front wheel bearings when the tractor is at rest and approximately 28% upon the rear wheel bearings, this proportion as a matter of course being dependent upon a large number of circumstances and features of construction entering into the makeup of the machine.

The condition above outlined is indicated in Figure 13 of the drawings. When, however, the engine is running and the tractor is pulling the normal load for which it is designed, the torque exerted upon the drivewheels tends to lift the front wheels from the ground and to force the rear wheels toward the ground, the result of the forces acting when the tractor is in use and pulling its load being that a greater portion of the weight of the machine is transferred to the rear driving wheels and more uniformly distributed tractive effort of each of the several wheels upon the ground is secured. According to my understanding and to the best of my observation and belief, the result of this redistribution of the weight or downward force exerted by the tractor is such that when the machine is in use substantially half the weight is borne upon the front and half upon the rear driving wheels under the conditions of use explained, thus securing substantially equal weight upon and tractive effort exerted by each of the four driving wheels of the tractor when the same is in use.

Having thus described and explained my invention, I claim and desire to secure by Letters Patent:

1. In a tractor of the class described having driving wheels located upon opposite sides thereof, and an engine for driving the tractor; two friction driving members driven in opposite directions about parallel transverse axes from said engine; two driving shafts supported to permit lateral displacement thereof at their inner ends and the outer ends of which are operatively connected with said driving wheels; two friction driven members carried one by the inner end of each shaft aforesaid; and means for laterally shifting the inner ends of said shafts and thereby moving said driven members into and out of engagement with said driving members.

2. In a tractor of the class described having driving wheels located upon opposite sides thereof, and an engine for driving the tractor; two friction driving members driven in opposite directions about parallel transverse axes from said engine; two unitary single-piece driving shafts the outer ends of which are supported in movable bearings so as to permit swinging movement of the inner ends of said shafts about said bearings as centers, and which outer ends are operatively connected with said driving wheels; two friction driven members secured one to the inner end of each shaft aforesaid; and means for moving said driven members into and out of engagement with said driving members.

3. In a tractor of the class described having driving wheels located upon opposite sides thereof, and an engine for driving the tractor; two friction driving members driven in opposite directions about parallel transverse axes from said engine; two driving shafts the outer ends of which are operatively connected with said driving wheels; two friction driven members carried one by the inner end of each shaft aforesaid; two movable bearing supporting members having bearings wherein the inner ends of said shafts are supported, permitting skewing of said shafts; and two pivotally supported levers operatively connected one with each of said bearing supporting members operative to skew either shaft at will.

4. In a tractor of the class described having driving wheels located upon opposite sides thereof, and an engine for driving the tractor; two friction driving members driven in opposite directions about parallel transverse axes from said engine; two unitary single-piece driving shafts the outer ends of which are supported in movable bearings so as to permit swinging movement of the inner ends of said shafts about said bearings as centers, and which outer ends are operatively connected with said driving wheels; two friction driven members secured one to the inner end of each shaft aforesaid; two movable bearing supporting members having bearings wherein the inner ends of said shafts are supported; and two pivotally supported levers operatively connected one with each of said bearing supporting members.

5. In a tractor of the class described having driving wheels located upon opposite sides thereof, and an engine for driving the tractor; two friction driving members driven from said engine; two driving shafts the outer ends of which are operatively connected with said driving wheels; two friction driven members carried one by the inner end of each shaft aforesaid; means forming two supports; two swinging bearing supporting members carried one by each support, and having each a bearing wherein the inner end of a driving shaft is supported; and two levers each pivotally supported, and which levers are operatively connected with each of said bearing supporting members.

6. In a tractor of the class described having driving wheels located upon opposite sides thereof, and an engine for driving the tractor; two friction driving members driven from said engine; two driving shafts the outer ends of which are operatively connected with said driving wheels; two friction driven members carried one by the inner end of each shaft aforesaid; means forming two supports having each a bearing; two engaging elements supported one in each of said bearings; two bearing supporting members carried one by each of said elements and having each a bearing wherein the inner end of a driving shaft is supported; and two levers pivotally supported and operatively connected one with each of said bearing supporting members.

7. In a tractor of the class described, driving mechanism comprising two forward friction driving members and two reverse friction driving members geared together so as to rotate in unison in opposite directions about parallel transverse axes; means for driving said several driving members from the engine of the tractor; two transversely extending driving shafts the outer ends of which are operatively connected with driving wheels upon opposite sides of the tractor; two annular friction driven members carried one by the inner end of each shaft aforesaid, and each of which members surrounds a forward and a reverse driving member geared together; and means for moving the annular driven member upon each shaft into engagement with either the forward or the reverse driving member which it surrounds, so that it will be driven by one or the other of said members.

8. In a tractor of the class described, driving mechanism comprising two forward friction driving members and two reverse friction driving members geared together so as to rotate in unison in opposite directions about parallel transverse axes; means for driving said several driving members from the engine of the tractor; two transversely extending driving shafts the outer ends of which are operatively connected with driving wheels upon opposite sides of the tractor; two annular friction driven members carried one by the inner end of each shaft aforesaid, and each of which members surrounds a forward and a reverse driving member geared together; a supporting frame associated with each of said annular driven members and which frame is pivotally supported at one end, and has adjusting means for varying the position thereof; an oscillating bearing carrying member supported by each frame intermediate the length thereof, and having a bearing whereby the end of a driving shaft is supported; a lever pivotally supported adjacent the free end of each frame; and a link through which each lever is operatively connected with a bearing carrying member.

9. In a tractor of the class described, driving mechanism comprising two forward friction driving members and two reverse friction driving members geared together so as to rotate in unison in opposite directions about parallel transverse axes; means for driving said several driving members from the engine of the tractor; two transversely extending driving shafts the outer ends of which are operatively connected with driving wheels upon opposite sides of the tractor; two annular friction driven members carried one by the inner end of each shaft aforesaid, and each of which members surrounds a forward and a reverse driving member geared together; a support associated with each of said annular driven members; an oscillating bearing carrying member supported by each support, and having a bearing whereby the end of a driving shaft is supported; adjusting means operative in effect to raise and lower each oscillating bearing; a lever pivotally supported adjacent each said bearing; a link through which each lever is operatively connected with a bearing carrying member; and two springs operatively connected one with each of said levers and which springs act normally to hold said friction driven members in engagement with the forward friction driving members aforesaid.

10. In a tractor of the class described, a transversely extending main frame of comparatively flexible construction and whereby the driving mechanism of the tractor is supported; two side frames which extend a distance in front and in rear of said main frame and which are of comparatively rigid construction having their middle portions secured one to each end of said main frame and adapted thereby to in effect rock independently of each other while passing over uneven ground; driving wheels carried by the front and rear ends of said side frames, so that the main frame is in a plane above the hubs of the wheels and is substantially shorter than the wheel base; and means through which said driving mechanism is operatively connected with said driving wheels.

11. In a tractor of the class described, a transversely extending main frame of comparatively flexible construction and whereby the driving mechanism of the tractor is supported; two side frames which extend a distance in front and in rear of said main frame and which are of comparatively rigid construction having their middle portions secured one to each end of said main frame and each of which comprises a horizontal top portion and two depending legs and adapted thereby to in effect rock independently of each other while passing over uneven ground; two driving wheels supported one at the lower end of each leg of each side frame, so that the main frame is in a plane above the hubs of the wheels and is substantially shorter than the wheel base; and a separate and independent sprocket chain operatively connected with each of said several wheels to drive the same.

12. In a tractor of the class described, a transversely extending main frame comprising two comparatively flexible frame bars arranged parallel with one another; two side frame members which extend a distance in front and in rear of said main frame and which are of comparatively rigid construction having their middle portions secured one to each end of said main frame and each comprising a horizontal top portion and two depending and diverging legs and adapted thereby to in effect rock independently of each other while passing over uneven ground; a driving wheel supported on the lower end of each of said several legs, so that the main frame is in a plane above the hubs of the wheels and is substantially shorter than the wheel base; driving mechanism carried by said main frame and including two driving shafts having sprocket pinions adjacent said end frames; a sprocket wheel carried by each of said wheels; and sprocket chains, one associated with each wheel, through which said several wheels are driven from said driving mechanism.

13. In a tractor of the class described, a transversely extending main frame comprising two comparatively flexible frame bars arranged parallel with one another; two side frame members which extend a distance in front and in rear of said main frame and which are of comparatively rigid construction having their middle portions secured one to each end of said main frame and adapted thereby to in effect rock independently of each other while passing over uneven ground; two wheels supporting journals carried by each side frame member and the axes of which are spaced farther apart than the frame bars aforesaid; four driving wheels supported one by each of said journals, so that the main frame is in a plane above the hubs of the wheels and is substantially shorter than the wheel base; and driving mechanism carried by said main frame and operatively connected with all of said wheels to drive all of them in unison.

14. In a tractor of the class described, a comparatively flexible main frame extending transverse to the direction of movement of the tractor; two side frame members which extend a distance in front and in rear of said frame and which are of comparatively rigid construction having their middle portions secured one to each end of said main frame and adapted thereby to in effect rock independently of each other while passing over uneven ground; two wheels supported by each of said side frame members and the axes of rotation of which are spaced farther apart in the direction of movement of the tractor than the dimension in the same direction of said main frame; and driving mechanism carried by said main frame and operatively connected with all of said wheels to drive them in unison.

15. In a tractor of the class described having end frames whereby driving wheels upon opposite sides of the tractor are supported, two friction driving members driven from the engine of the tractor, and each of which is provided with a plurality of circumferentially extending V-shaped grooves; two transversely extending driving shafts the outer ends of which are operatively connected with the driving wheels of the tractor; two annular friction driven members each having a plurality of internal circumferentially extending ridges corresponding in form with the grooves aforesaid, and which members are secured one to the inner end of each driving shaft and surround the driving member with which it co-operates; and means for moving said annular members to cause the ridges thereof to enter the grooves aforesaid.

16. In a tractor of the class described having end frames whereby driving wheels upon opposite sides of the tractor are supported, two forward and two reverse friction driving members driven from the engine of the tractor, and each of which is provided with a plurality of circumferentially extending V-shaped grooves; two transversely extending angularly movable driving shafts the outer ends of which are supported in rocking bearings, and which shafts are operatively connected with the driving wheels of the tractor; two annular friction driven members each having a plurality of internal circumferentially extending ridges corresponding in form with the grooves aforesaid, and which members are secured one to the inner end of each driving shaft and surround a forward and a reverse driving member; and means for moving each driven member into engagement with the forward and with the reverse driving member with which it co-operates.

17. In a tractor of the class described having end frames whereby driving wheels upon opposite sides of the tractor are supported, two forward and two reverse friction driving members driven from the engine of the tractor, and each of which is provided with a plurality of circumferentially extending V-shaped grooves; two transversely extending angularly movable driving shafts the outer ends of which are supported in rocking bearings, and which shafts are operatively connected with the driving wheels of the tractor; two annular friction driven members each having a plurality of internal circumferentially extending ridges corresponding in form with the grooves aforesaid, and which members are secured one to the inner end of each driving shaft and surround a forward and a reverse driving member; two supporting frames; two bearing supports carried one by each of said frames, and which supports are capable of a swinging movement and also of movement substantially parallel with the axes of said driving shafts; bearings carried by said supports and wherein the inner ends of said driving shafts are supported; and two levers carried one by each of said frames, and which levers are operatively connected one with each of said supports so as to impart swinging movement thereto.

18. In a tractor of the class described having a transversely extending main frame, two reversible end frames detachably secured one to each end of said main frame and each of which is provided with two driving wheels; two transversely extending driven shafts each having sprocket pinions adjacent its outer end; sprocket chains through which both wheels at each side of the tractor may be driven from the pinions at the corresponding end of a driving shaft: and means to drive each driving shaft.

19. In a tractor of the class described having a transversely extending main frame, two reversible end frames detachably secured one to each end of said main frame and each of which is provided with two driving wheels; and means including sprocket chains through which both wheels at each side of the tractor may be driven in either the outside or inside position of said wheels.

20. In a tractor of the class described having a transversely extending main frame, two reversible end frames detachably secured one to each end of said main frame and each of which is provided with two driving wheels; and means for driving said wheels in either the outside or the inside position thereof.

21. In a tractor of the class described, means whereby two driving wheels upon each side of the tractor are supported; two forward and two reverse driving members driven from the engine of the tractor; two transversely extending angularly movable driven shafts having each two pairs of sprocket pinions adjacent its outer end; swinging bearings wherein each driving shaft is supported between the pairs of sprocket pinions thereupon; sprocket chains through which both wheels at each side of the tractor may be driven from either pair of sprocket pinions at the corresponding end of a driving shaft; two annular driven members secured one to the inner end of each driving shaft, and each of which surrounds a forward and a reverse driving member; and means for moving each driving member into engagement with the forward and with the reverse driving member aforesaid.

22. In a tractor of the class described, means whereby two driving wheels upon each side of the tractor are supported; two forward and two reverse driving members driven from the engine of the tractor; two transversely extending angularly movable driven shafts having each two pairs of sprocket pinions adjacent its outer ends; swinging bearings carried wherein each driving shaft is supported between the pairs of sprocket pinions thereupon; sprocket chains through which both wheels at each end of the tractor may be driven from either pair of sprocket pinions at the corresponding end of a driving shaft; two annular driven members secured one to the inner end of each driving shaft, and each of which surrounds a forward and a reverse driving member; two supporting frames; two swinging bearing supports having each a bearing wherein the inner end of a driving shaft is supported; and two levers carried one by each of said frames, and which levers are operatively connected one with each of said swinging bearing supports.

23. In a tractor of the class described, driving mechanism comprising a friction driving member driven from the engine of the tractor and having a plurality of circumferentially extending V-shaped grooves; an angularly movable driving shaft the outer end of which is supported in a rocking bearing, and which end is operatively connected with a driving wheel of the tractor; an annular friction driven member secured to the inner end of said shaft, and which member surrounds said driving member and is provided with a plurality of internal ridges corresponding in form with the grooves aforesaid; and means for moving the inner end of said shaft to angularly adjust the shaft and thereby cause the ridges within said driven member to enter the grooves aforesaid.

24. In a tractor of the class described, driving mechanism comprising a friction driving member driven from the engine of the tractor and having a plurality of circumferentially extending V-shaped grooves; an angularly movable driving shaft the outer end of which is supported in a rocking bearing, and which end is operatively connected with a driving wheel of the tractor; an annular friction driven member secured to the inner end of said shaft, and which member surrounds said driving member and is provided with a plurality of internal ridges corresponding in form with the grooves aforesaid; a swinging bearing carrying member having a bearing wherein the inner end of said shaft is supported; and means for moving said bearing carrying member to angularly adjust the shaft and thereby cause the ridges within said driven member to enter the grooves aforesaid.

25. In a tractor of the class described, driving mechanism comprising a friction driving member driven from the engine of the tractor and having a plurality of circumferentially extending V-shaped grooves; an angularly movable driving shaft the outer end of which is supported in a rocking bearing, and which end is operatively connected with a driving wheel of the tractor; an annular friction driven member secured to the inner end of said shaft, and which member surrounds said driving member and is provided with a plurality of internal ridges corresponding in form with the grooves aforesaid; an adjustable frame having a bearing the axis of which is substantially parallel with the axis of said driving shaft; a journal movable both angularly and longitudinally within said bearing; a swinging bearing carrying member carried by said journal and having a bearing wherein the inner end of said driving shaft is supported; an oscillating lever carried by said frame; and a link intermediate said lever and said bearing carrying member.

26. In a tractor of the class described, driving mechanism comprising a friction driving member driven from the engine of the tractor and having a plurality of circumferentially extending V-shaped grooves; a driving shaft movable both angularly and longitudinally; a rocking bearing adjacent the outer end of said shaft and wherein said outer end is supported, and along or through which said outer end may move to a slight extent; means through which said outer end is operatively connected with a driving wheel of the tractor; an annular friction driven member secured to the inner end of said shaft, and which member surrounds said driving member and is provided with a plurality of internal ridges corresponding in form with the grooves aforesaid; and means for moving the inner end of said shaft to cause the ridges within said driven member to enter the grooves aforesaid.

27. In a tractor of the class described, a transversly extending main frame; a centrally located housing supported by said frame; an engine casing supported by said housing and located in front thereof; a transversly arranged shaft driven from said engine and supported in bearings carried by the side walls of said housing; two friction driving members secured one to each end of said shaft; two angularly movable shafts extending from said housing to and the outer ends of which are operatively connected with driving wheels at the sides of the tractor; two annular friction driven members secured one to the inner end of each driving shaft, and which members surround the driving members aforesaid; and means carried by said housing for moving the inner ends of said shafts to cause the inner peripheries of said driven members to engage the driving members aforesaid.

28. In a tractor of the class described, a transversly extending main frame; a centrally located housing supported by said frame; an engine casing supported by said housing and located in front thereof; a transversly arranged shaft supported in bearings carried by the side walls of said housing; two friction driving members secured one to each end of said shaft; two angularly movable driving shafts extending from said housing to and the outer ends of which are operatively connected with driving wheels at the sides of the tractor; two annular friction driven members secured one to the inner end of each driving shaft, and which members surround the driving members aforesaid and are normally out of contact therewith; a pedestal carried by said housing; two frames pivotally connected with said pedestal; two swinging bearing carrying members carried one by each frame, and having bearings wherein the inner ends of said driving shafts are supported; and two levers carried one by each frame, and which levers are operatively connected one with each of said bearing carrying members.

29. In a tractor of the class described, a transversly extending main frame; a centrally disposed housing supported by said frame; an engine casing supported by said housing and located in front thereof; two transversly arranged shafts driven in opposite directions from said engine, and which shafts are supported in bearings carried by the side walls of said housing; two forward friction driving members secured to the ends of one of said shafts, and two reverse friction driving members secured to the ends of the other of said shafts; two transversly extending driving shafts the outer ends of which are operatively connected with driving wheels upon opposite sides of the tractor, and the inner ends of which carry annular friction driven members each of which surrounds both a forward driving member and a reverse driving member, and is normally out of engagement with said members and is movable into engagement with one or the other of said members; and means carried by said housing for moving each driven member into engagement with either the forward or the reverse driving member which it surrounds.

30. In a tractor of the class described, an end frame having a downwardly extending leg; a bracket slidable upon the lower end of said leg; means for securing said bracket in various adjusted positions upon said leg; and a wheel supporting spindle carried by said bracket.

31. In a tractor of the class described, an end frame having a downwardly extending leg; a bracket having a passage into which said leg extends, and the lower end of which passage is threaded; a threaded abutment adjustable along said passage and against which the lower end of said leg abuts; means for clamping said bracket upon the lower end of said leg; and a wheel supporting spindle carried by said bracket.

32. In a tractor of the class described, an end frame member having two downwardly extending diverging legs; two brackets located one at the lower end of each of said legs, and each of which is adapted to support a driving wheel; and means for adjusting said brackets to thereby vary the positions of the wheels relative to the end frame.

33. In a tractor of the class described, driving mechanism comprising two forward friction driving members and two reverse friction driving members geared together so as to rotate in unison in opposite directions; means for driving said several driving members from the engine of the tractor; two transversely extending driving shafts the outer ends of which are operatively connected with driving wheels upon opposite sides of the tractor; two annular friction driven members operatively connected to the inner end of each shaft aforesaid, and each of which members surrounds a forward and a reverse driving member; and means for moving the annular driven member upon each shaft into engagement with either the forward or the reverse driving member which it surrounds, so that it will be driven by one or the other of said members.

34. In a tractor of the class described, driving mechanism comprising forward friction driving members and reverse friction driving members geared together so as to rotate in unison in opposite directions; means for driving said several driving members from the engine of the tractor; transversely extending driving shafts the outer ends of which are operatively connected with driving wheels upon opposite sides of the tractor; annular friction driven members carried one by the inner end of each shaft aforesaid, and each of which members surrounds a forward and a reverse driving member; a supporting frame associated with each of said annular driven members and which frame is pivotally supported at one end, and has adjusting means for varying the position thereof; an oscillating bearing carrying member supported by each frame intermediate the length thereof, and having a bearing whereby the end of a driving shaft is supported; and levers pivotally supported and a link through which each lever is operatively connected with a bearing carrying member.

35. In a tractor of the class described, driving mechanism comprising forward friction driving members and reverse friction driving members geared together so as to rotate in unison in opposite directions; means for driving said several driving members from the engine of the tractor; transversely extending driving shafts the outer ends of which are operatively connected with driving wheels upon opposite sides of the tractor; annular friction driven members carried one by the inner end of each shaft aforesaid, and each of which members surrounds a forward and a reverse driving member; a supporting frame associated with each of said annular members and which frame is pivotally supported at one end, and has adjusting means for varying the position thereof; an oscillating bearing carrying member supported by each frame intermediate the length thereof, and having a bearing whereby the end of a driving shaft is supported; a lever pivotally supported and a link through which each lever is operatively connected with a bearing carrying member; and two springs operatively connected one with each of said levers and which springs act normally to hold said friction driven members in engagement with the forward friction driving members aforesaid.

36. In a tractor of the class described, driving mechanism comprising forward friction driving members and reverse friction driving members geared together so as to rotate in unison in opposite directions; means for driving said several driving members from the engine of the tractor; transversely extending driving shafts the outer ends of which are operatively connected with driving wheels upon opposite sides of the tractor; annular driven members carried one by the inner end of each shaft aforesaid, and each of which members is adjacent a forward and a reverse driving member; a supporting frame associated with each of said annular driven members and which frame is pivotally supported at one end, and has adjusting means for varying the position thereof; an oscillating bearing carrying member supported by each frame intermediate the length thereof, and having a bearing whereby the end of a driving shaft is supported; a lever pivotally supported adjacent the free end of each frame; and a link through which each lever is operatively connected with a bearing carrying member.

37. In a tractor of the class described, driving mechanism comprising forward friction driving members and reverse friction driving members geared together so as to rotate in unison in opposite directions; means for driving said several driving members from the engine of the tractor; transversely extending driving shafts the outer ends of which are operatively connected with driving wheels upon opposite sides of the tractor; annular friction driven members carried one by the inner end of each shaft aforesaid, and each of which is adjacent a forward and a reverse driving member; a support associated with each of said annular driven members; an oscillating bearing carrying member supported by each support, and having a bearing whereby the end of a driving shaft is supported; a lever pivotally supported adjacent each said bearing; a link through which each lever is operatively connected with a bearing carrying member; and springs operatively connected one with each of said levers and which springs act normally to hold said friction driven members in engagement with the forward friction driving members aforesaid.

38. In a tractor of the class described, driving mechanism comprising forward friction driving members and reverse friction driving members geared together so as to rotate in unison in opposite directions and provided with V-shaped peripheral grooves; means for driving said several driving members from the engine of the tractor; transversely extending driving shafts the outer ends of which are operatively connected with driving wheels upon opposite sides of the tractor; annular friction driven members carried one by the inner end of each shaft aforesaid, and each of which members surrounds a forward and a reverse driving member and is provided with internal circumferentially extending ridges shaped to engage said V-shaped grooves; and means for moving the annular driven member upon each shaft into engagement with either the forward or the reverse driving member which it surrounds, so that it will be driven by one or the other of said members.

39. In a tractor of the class described, driving mechanism comprising forward friction driving members and reverse friction driving members geared together so as to rotate in unison in opposite directions and provided with V-shaped peripheral grooves; means for driving said several driving members from the engine of the tractor; transversely extending driving shafts the outer ends of which are operatively connected with driving wheels upon opposite sides of the tractor; annular friction driven members carried one by the inner end of each shaft aforesaid, and each of which members surrounds a forward and a reverse driving member and is provided with internal circumferentially extending ridges shaped to engage said V-shaped grooves; a support associated with each of said annular driven members; an oscillating bearing carrying member supported by each support, and having a bearing whereby the end of a driving shaft is supported; and a lever pivotally supported; and a link through which each lever is operatively connected with a bearing carrying member.

40. In a tractor of the class described, driving mechanism comprising forward friction driving members and reverse friction driving members geared together so as to rotate in unison in opposite directions and provided with V-shaped peripheral grooves; means for driving said several driving members from the engine of the tractor; transversely extending driving shafts the outer ends of which are operatively connected with driving wheels upon opposite sides of the tractor; annular friction driven members carried one by the inner end of each shaft aforesaid, and each of which members surrounds a forward and a reverse driving member and is provided with internal circumferentially extending ridges shaped to engage said V-shaped grooves; a supporting frame associated with each of said annular driven members and which frame is pivotally supported at one end, and has adjusting means for varying the position thereof; an oscillating bearing carrying member supported by each frame intermediate the length thereof, and having a bearing whereby the end of a driving shaft is supported; a lever pivotally supported adjacent the free end of each frame; a link through which each lever is operatively connected with a bearing carrying member, and springs operatively connected one with each of said levers and which springs act normally to hold said friction driven members in engagement with the forward friction driving members aforesaid.

41. In a tractor of the class described, the combination and organization of a transversely extending main frame; end frames secured one to each end of the main frame, with the ends of the main frame extending over the tops of the side frames, and each of which end frames is provided with wheels at the lower ends thereof; a supporting member supported under said main frame at the central portion thereof; driving mechanism supported by said supporting member and including driving shafts extending into the vicinity of said side frames, hung in bearings on the under sides of the top portions of said side frames, and the outer ends of which are operatively connected each with the wheels aforesaid on one side of the tractor to thereby drive the same; and an engine supported entirely by said supporting member and located in front of said main frame.

42. In a tractor of the class described, the combination and organization of a transversely extending main frame; end frames secured one to each of said main frame, with the ends of the main frame extending over the tops of the side frames, and each of which end frames is provided with downwardly diverging legs; wheels located one at the lower extremity of each of said legs; a supporting member supported under said main frame intermediate the ends thereof; driving mechanism supported by said supporting member and including driving shafts extending to said side frames, hung in bearings on the under sides of the top portions of said side frames, and the outer ends of which are operatively connected with the wheels aforesaid to drive the tractor; and an engine supported entirely by said supporting member and located in front of said main frame.

43. In a tractor of the class described, the combination and organization of a transversely extending comparatively narrow main frame; end frames secured one to each of said main frames, with the ends of the main frame extending over the tops of the side frames, and each of which includes a horizontal top portion, and depending and diverging legs one at each end of said top portion; bearing spindles located one at the lower end of each of said legs, and the axes of which spindles are spaced farther apart than the length of said frame in the direction of travel of the tractor; wheels carried one by each of the spindles aforesaid; a supporting member supported under said main frame and located at the middle portion thereof; driving mechanism supported by said supporting member and including driving shafts extending below the upper portions of said frames and supported in bearings carried by the horizontal upper portions thereof, and the outer ends of which driving shafts are operatively connected with said wheels so as to drive all of them; and an engine supported entirely by said supporting member and located in front of said main frame.

44. In a tractor of the class described, the combination and organization of a transversely extending main frame; side frames secured one to each end of said main frame, with the ends of the main frame extending over the tops of the side frames, and each of which end frames is provided with wheels; a hollow housing supported under said main frame adjacent the central portion thereof, and the front end of which housing is open; gearing within said casing; driving mechanism supported by said housing and driven through said gearing, and which driving mechanism includes driving shafts extending under the upper portions of said side frames, and the outer ends of which are operatively connected with the wheels aforesaid to drive the tractor; and an engine having a crank case the rear end of which is secured to the open front end of said housing, so that said engine is supported entirely at its rear end.

45. In a tractor of the class described, the combination and organization of a transversely extending main frame; side frames secured one to each end of said main frame, with the ends of the main frame extending over the tops of the side frames, and each of which end frames is provided with wheels; a hollow housing supported under said main frame adjacent the central portion thereof, and the front end of which housing is open; gearing within said casing; driving mechanism supported by said housing and driven through said gearing, and which driving mechanism includes driving shafts extending to said side frames, and the outer ends of which are operatively connected with the wheels aforesaid to drive the tractor; bearings carried one by each of said side frames and whereby the outer end portions of said driving shafts are supported below the top portions of the side frames; and an engine having a crank case the rear end of which is secured to the open front of said housing, so that said engine is supported entirely at its rear end, and which engine is operatively connected with said gearing.

46. In a tractor of the class described, the combination and organization of a transversely extending main frame; side frames secured one to each end of said main frame, with the ends of the frame extending over the tops of the side frames; and each of which includes downwardly extending diverging legs; driving wheels supported one from the lower end of each of said legs, and the axes of rotation of which are spaced farther apart in a direction of movement of the tractor than the length in the same direction of said main frame; a hollow housing supported by said main frame adjacent the central portion thereof and beneath the same, and the front end of which housing is open and lies approximately in the plane of the front end of said main frame; gearing located within said housing; driving mechanism supported by said housing and driven from said gearing, and which driving mechanism includes driving shafts extending below the upper portions of said side frames, and the outer ends of which are operatively connected with all of said wheels to drive all of them in unison; bearings for the outer ends of said driving shafts; and an engine having a crank case the rear end of which is secured to the open front end of said housing, so that said engine is supported entirely at its rear end, and which engine is operatively connected with said gearing.

47. In a tractor of the class described, a transversely extending main frame of comparatively flexible construction and whereby the driving mechanism of the tractor is supported in a substantially central position spaced apart from the ends of said frame; the two side frames of comparatively rigid construction secured one to each end of said main frame and each of which comprises a horizontal top portion, and two depending legs; four driving wheels supported one at the lower end of each leg of each side frame; and a separate and independent sprocket chain operatively connected with each of said several wheels to drive the same.

48. In a tractor of the class described, a transversely extending main frame whereby the driving mechanism of the tractor is supported; two side frames secured one to each end of said main frame and each of which comprises a horizontal top portion and two depending legs; four driving wheels supported one at the lower end of each leg of each side frame; two driving shafts extending from said driving mechanism to said end frames and two sprocket chains upon each side of the tractor, one extending from the adjacent driving shaft to one of the wheels upon said side, and the other extending from said driving shaft to the other of the wheels.

49. In a tractor of the class described, a comparatively flexible main frame extending transversely to the direction of movement of the tractor; two side frame members of comparatively rigid construction secured one to each end of said main frame; two wheels supported by each of said side frame members and the axes of rotation of which are spaced farther apart in the direction of movement of the tractor than the corresponding dimension of said main frame; and driving mechanism carried by said main frame and operatively connected with all of said wheels to drive them in unison.

50. In a tractor of the class described, a transversely extending main frame consisting of two members spaced apart; two end frames secured one to each end of said main frame, and each of which includes two downwardly extending diverging legs; four driving wheels supported one from the lower end of each of said legs, and the axes of rotation of which are spaced farther apart in a direction of movement of the tractor than the length in the same direction of said main frame; a hollow housing supported by said main frame members adjacent the central portion thereof and beneath the same, and the front end of which housing is open and lies approximately in the plane of the front side of said main frame; gearing located within said housing; driving mechanism supported by said housing and driven from said gearing, and which driving mechanism includes two driving shafts extending to said side frames, and the outer ends of which shafts are operatively connected with all of said wheels to drive all of them in unison; bearings for the outer ends of said driving shafts; and an engine having a crank case the rear end of which is secured to the open front end of said housing, and which engine is operatively connected with said gearing.

ALVARO S. KROTZ.